J. HEINRICH.
REFRIGERATING APPARATUS.
APPLICATION FILED MAY 12, 1908.

942,445.

Patented Dec. 7, 1909.
6 SHEETS—SHEET 1.

WITNESSES:
J. C. Irwin
E. B. House

John Heinrich INVENTOR.
BY Warren D. House
His ATTORNEY.

J. HEINRICH.
REFRIGERATING APPARATUS.
APPLICATION FILED MAY 12, 1908.

942,445.

Patented Dec. 7, 1909.
6 SHEETS—SHEET 2.

WITNESSES:
J. C. Irwin
E. B. House

INVENTOR.
John Heinrich
BY Warren D. House
His ATTORNEY.

J. HEINRICH.
REFRIGERATING APPARATUS.
APPLICATION FILED MAY 12, 1908.

942,445.

Patented Dec. 7, 1909.
6 SHEETS—SHEET 5.

WITNESSES:
J. C. Irwin
E. B. House

INVENTOR.
John Heinrich
BY
Warren D. House
His ATTORNEY.

J. HEINRICH.
REFRIGERATING APPARATUS.
APPLICATION FILED MAY 12, 1908.

942,445.

Patented Dec. 7, 1909.
6 SHEETS—SHEET 6.

WITNESSES:
J. C. Irwin
E. B. House

INVENTOR.
John Heinrich
BY
Warren D. House
His ATTORNEY.

UNITED STATES PATENT OFFICE.

JOHN HEINRICH, OF KANSAS CITY, MISSOURI, ASSIGNOR OF ONE-HALF TO EDWARD T. POWERS, OF KANSAS CITY, MISSOURI.

REFRIGERATING APPARATUS.

942,445.　　　　　Specification of Letters Patent.　　Patented Dec. 7, 1909.

Application filed May 12, 1908. Serial No. 432,403.

*To all whom it may concern:*

Be it known that I, JOHN HEINRICH, a citizen of the United States, residing at Kansas City, in the county of Jackson and State of Missouri, have invented certain new and useful Improvements in Refrigerating Apparatus, of which the following is a specification.

My invention relates to improvements in refrigerating apparatus.

It relates particularly to the type of refrigerating apparatus in which refrigerating fluid is compressed, condensed and then permitted to expand to effect the desired refrigeration, the expanded fluid then being successively compressed and expanded. In such types of refrigerating apparatus the expanded fluid has a comparatively low temperature, sometimes being low enough to effect freezing up of the compressing mechanism, thereby interfering with its proper operation.

The object of my present invention is to provide means by which the heat of the compressed fluid is transferred to the expanded fluid, thereby effecting the lowering of the temperature of the compressed fluid and raising the temperature of the expanded fluid so that the compressing mechanism will not be liable to freezing.

A further object of my invention is to effect the saving of water employed to cool the compressed fluid. This is accomplished by immersing the conductors conveying the compressed and expanded fluid in the same body of water in close proximity to each other. The absorption of heat from the water by the expanded fluid retains the water at a comparatively low temperature, so that rapid evaporation is not produced.

The novel features of my invention are hereinafter more particularly described and claimed.

Figure 1:
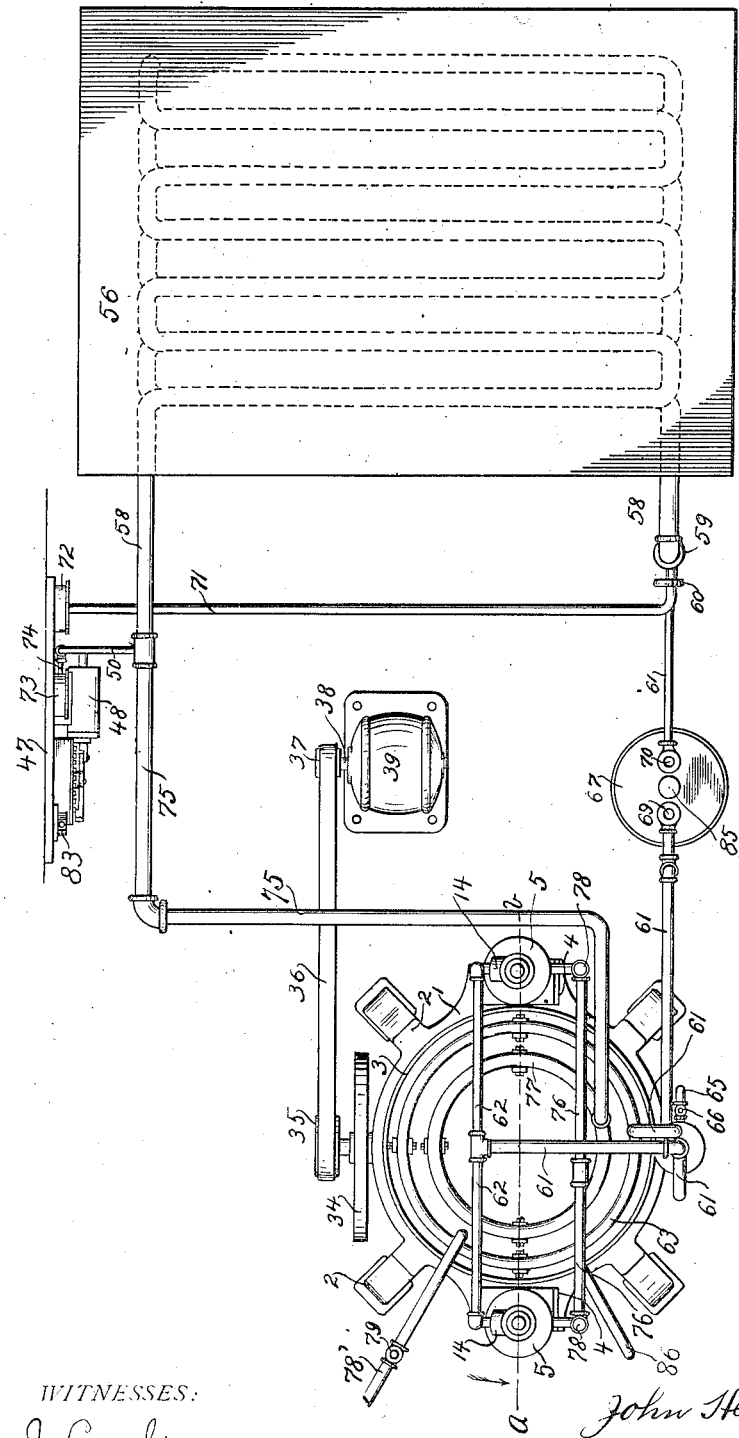
Figure 2:
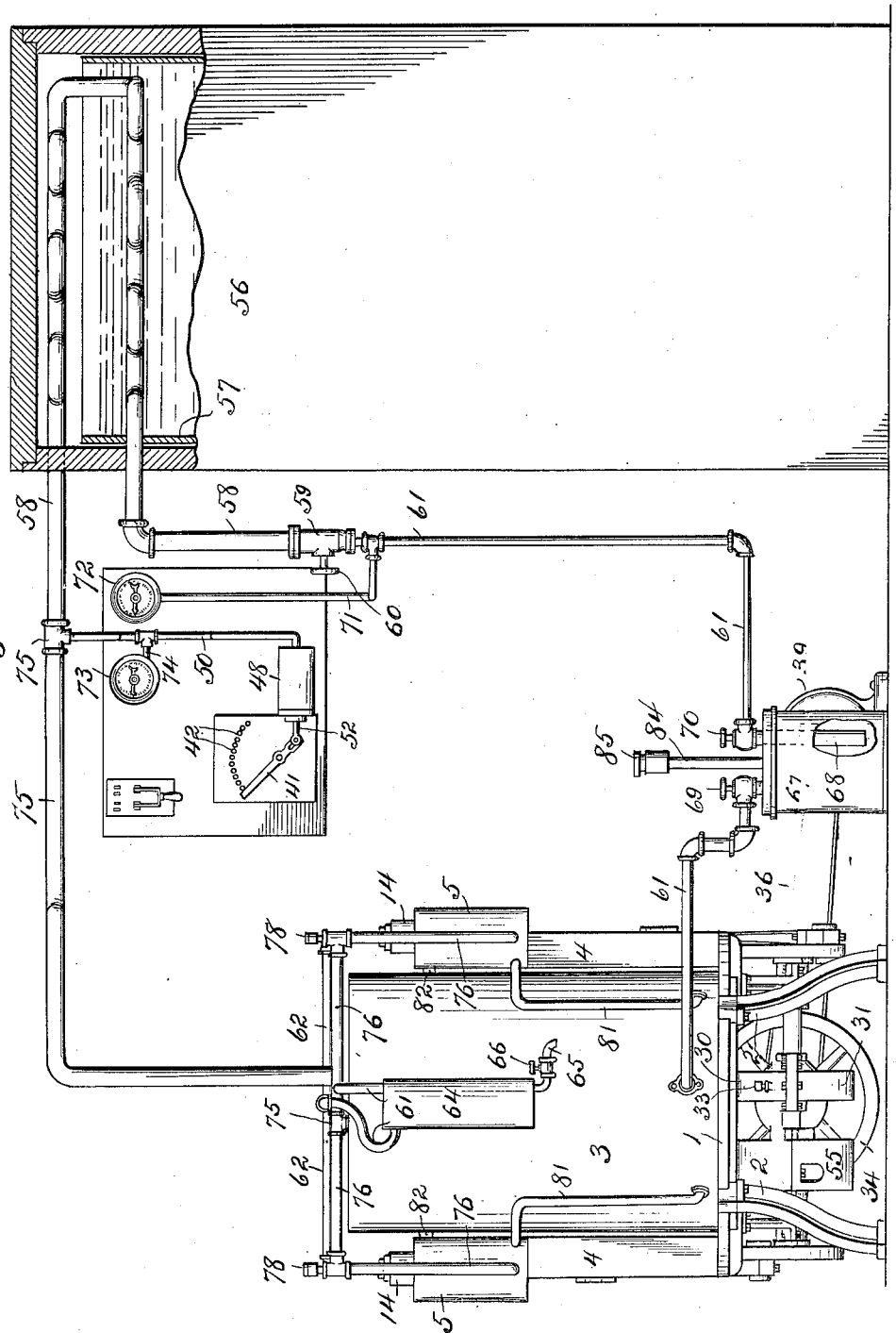
Figure 3:
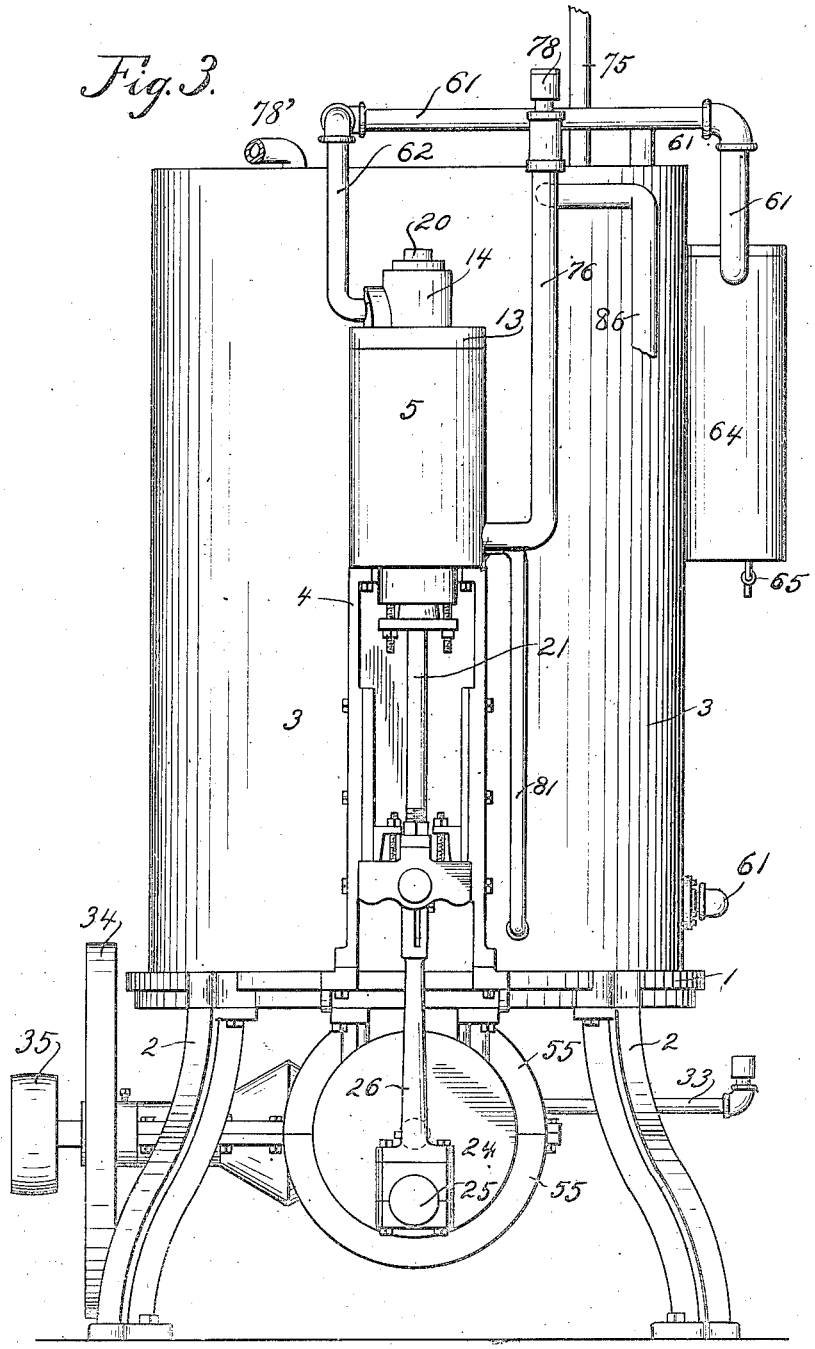
Figure 4:
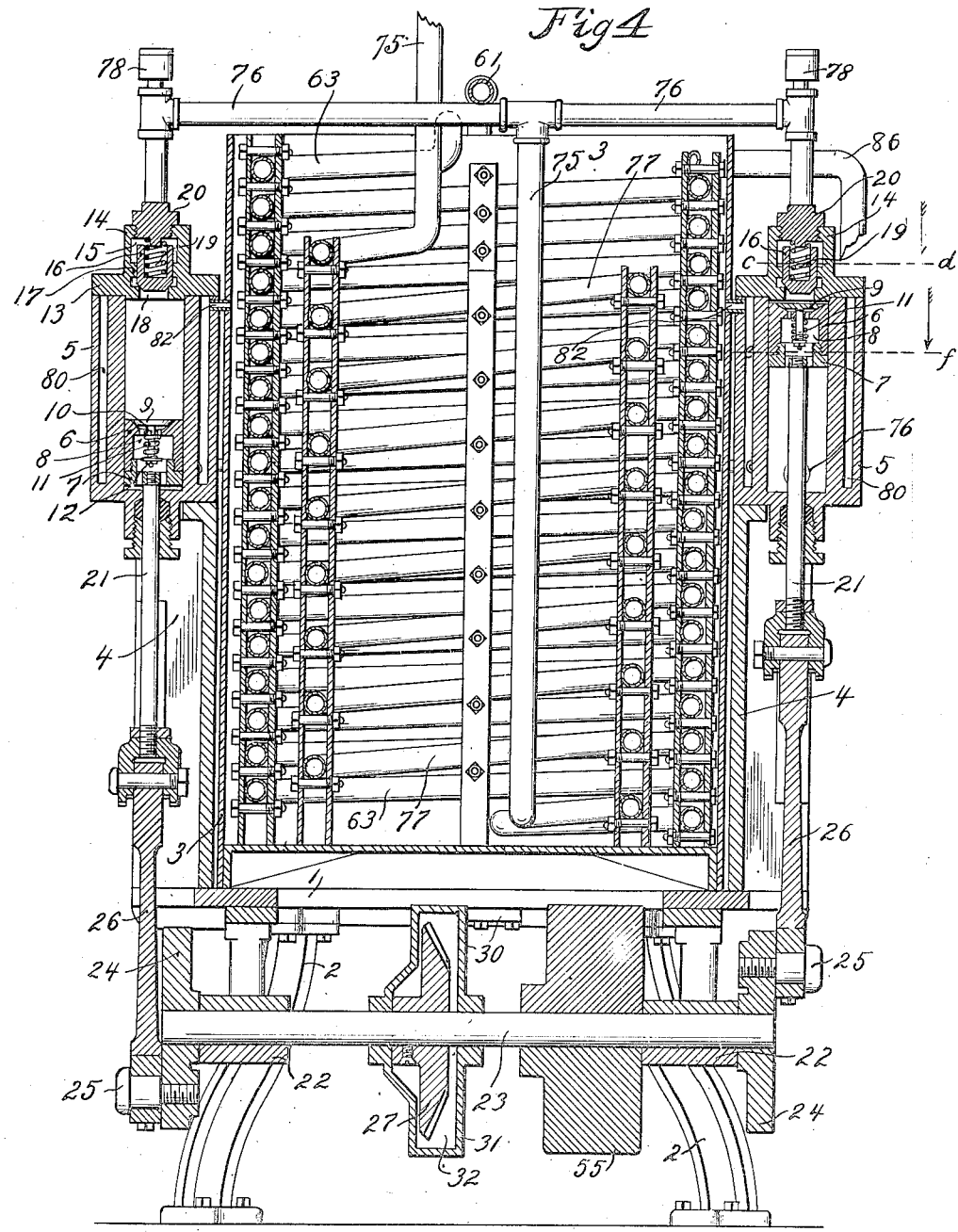
Figure 5:
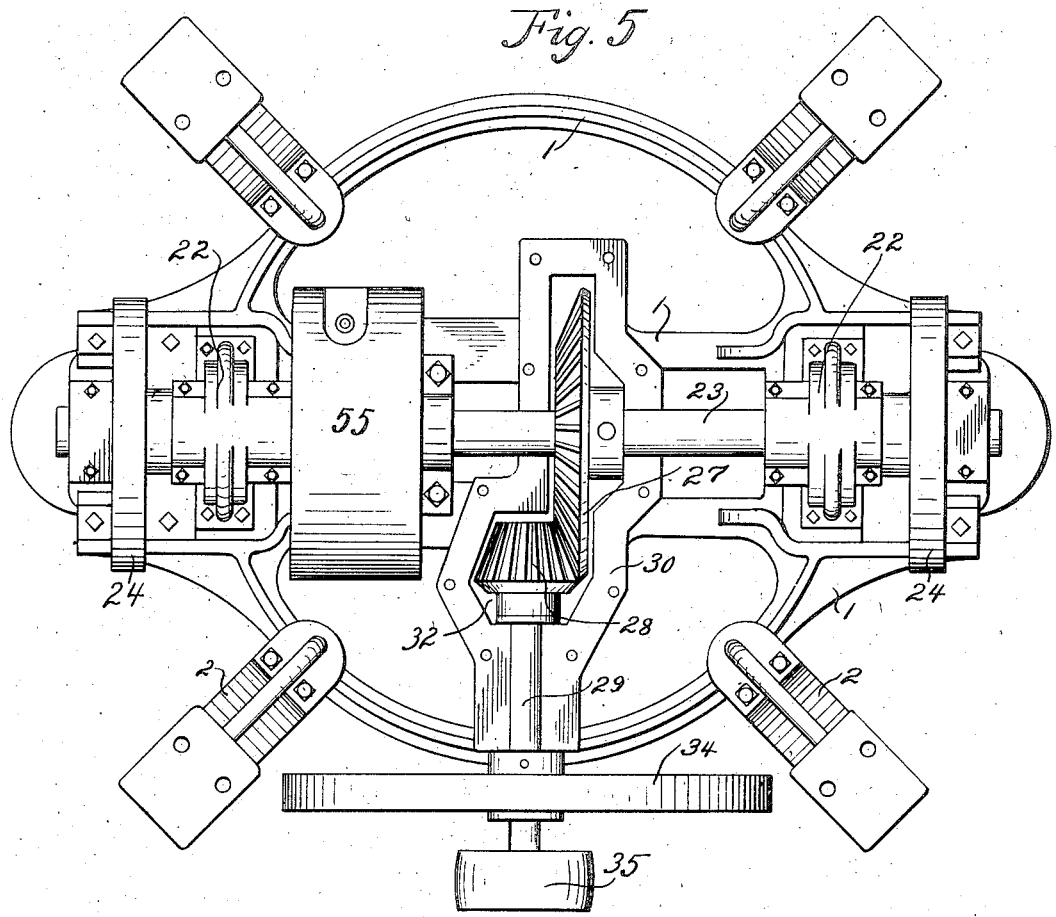
Figure 6:
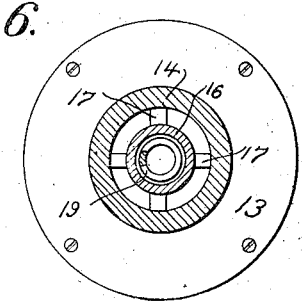
Figure 7:
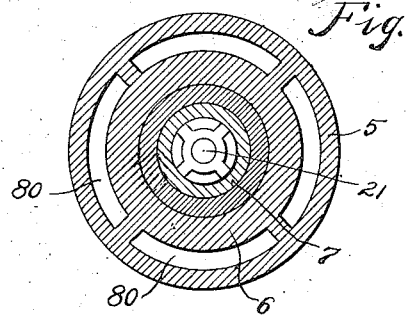
Figure 8:
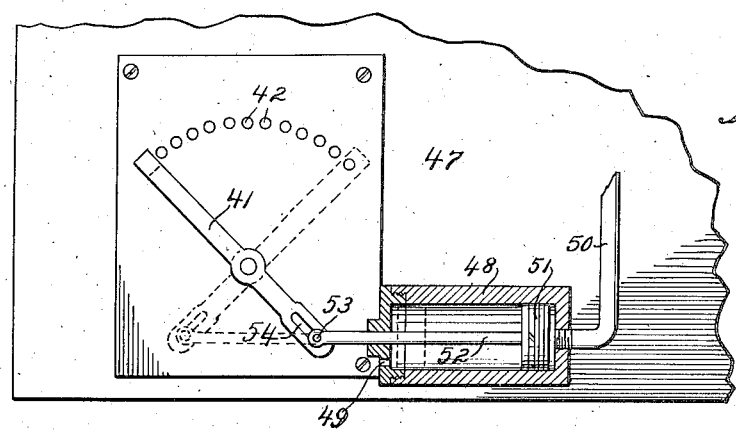
Figure 9:
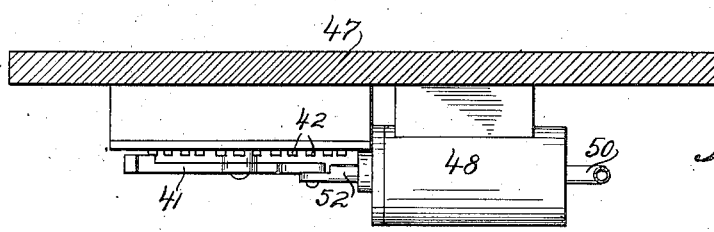
Figure 10:
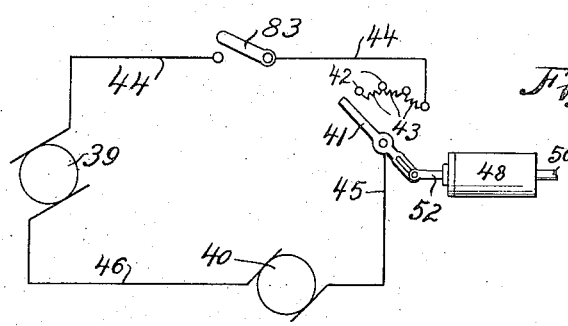

In the accompanying drawings illustrative of my invention, Figure 1 is a plan view of the apparatus. Fig. 2 is a side elevation, a portion of the refrigerating cabinet being broken away. Fig. 3 is a side elevation of the compressing mechanism disposed in a position at right angles to the position occupied by it in Fig. 2. Fig. 4 is a vertical sectional view taken on the dotted line *a—b* of Fig. 1. Fig. 5 is a plan view of the compressor driving means looking at the underside thereof. In this view the lower half of the gear casing is removed. Fig. 6 is a cross section taken on the dotted line *c—d* of Fig. 4. Fig. 7 is a cross section taken on the dotted line *e—f* of Fig. 4. Fig.
8 is an enlarged view partly in elevation and partly in vertical section of the rheostat and mechanism controlling the action thereof. Fig. 9 is a plan view of the mechanism shown in Fig. 8, the support for said mechanism being shown in horizontal section. Fig. 10 is a diagrammatic view of the circuit in which the rheostat is located.

Similar characters of reference denote similar parts.

1 denotes a horizontal base of substantially circular form provided with supporting legs 2. Upon the base 1 is mounted a receptacle comprising preferably a vertical cylinder 3 having a closed lower end and an open upper end. Mounted on the base 1 at diametrically opposite sides of the cylinder or tank 3, are two vertical and preferably channel shaped supports 4, upon which are respectively mounted two vertical cylinders 5, in which are respectively reciprocatively mounted two pistons, comprising preferably each, an upper cylindrical portion 6 and a lower cylindrical portion 7, each having a vertical hole therethrough, the two holes forming a longitudinal opening 8 through the piston, the upper end of which is closed on the upward movement of the piston by a vertically movable valve 9 provided on its lower side with a vertical stem 10 on which is mounted a coil spring 11 the lower end of which is supported on a collar 12 carried by the stem, the upper end of the string bearing upon the piston member 6 and normally holding the valve 9 in the closed position. The upper end of each cylinder 5 is provided with a head 13, provided with a central vertical projection 14, having a chamber 15 in which is a cup shaped valve 16, vertically movable in the chamber 15, between radial projections or guides 17, disposed around the periphery of the chamber 15. A vertical opening 18 connects the interior of the cylinder 5 with the chamber 15. The valve 16 is normally held in a position closing said opening 18 by a coil spring 19 mounted in said valve and having its upper end bearing against the lower end of a plug 20, fitted to a screw threaded opening in the upper end of the projection 14. Two vertical piston rods 21 extend respectively through the lower ends of the cylinders 5 and have their upper ends secured respectively to the central portions of the piston members 7.

Upon the underside and at diametrically opposite points of the base 1 are secured two brackets 22 in which is rotatively mounted a horizontal driving shaft 23, having secured to its opposite ends two crank disks 24, each having secured thereto an eccentrically disposed horizontal crank pin 25. Two connecting rods 26 are pivotally connected at their upper ends respectively to the lower ends of the piston rods 21, the lower ends of said connecting rods being respectively pivoted to the crank pins 25.

Secured rigidly upon the driving shaft 24 is a bevel gear wheel 27 which meshes with a bevel pinion 28 rigidly secured upon a horizontal shaft 29 rotatively mounted in a bearing comprising two hollow members 30 and 31, disposed respectively above and below and embracing the shaft 23. Said two members are bolted to each other, the upper member being bolted to the underside of the base 1. The members 30 and 31 inclose a chamber 32 in which are mounted the gears 27 and 28. Said chamber is adapted to contain lubricating oil which is introduced therein through a horizontal pipe 33, as shown in Fig. 3. Rigidly secured to the shaft 29 is a fly wheel 34 and a pulley 35. As shown in Fig. 1, the pulley 35 is connected by means of a belt 36 with a pulley 37 secured upon the armature shaft 38 of an electric motor 39.

The motor 39 is located in circuit with a current generator such as a dynamo 40, and a rheostat comprising a pivoted lever 41 and a plurality of contacts 42 connected in series with each other by resistance coils 43. As shown in Fig. 10, one brush of the motor 39 is connected by a conductor 44 with one of the end contacts 43. The lever 41 is connected by a conductor 45 with one of the brushes 40 of the dynamo, the other brush of which is connected by conductor 46 with the other terminal of the motor 39.

Referring particularly to Fig. 8, 47 denotes a support on which the rheostat is mounted and to which is secured a cylinder 48 provided at one end with an air inlet 49, and at the other end with an inlet for fluid in which is mounted one end of a conductor 50. Reciprocatively mounted in the cylinder 48, intermediate said two inlets is a piston 51 to one end of which is secured a piston rod 52 the outer end of which has secured to it the transverse pin 53, which is longitudinally movable in a longitudinal slot 54 provided in the adjacent end of the rheostat lever 41. When the pressure in the conductor 50 exceeds the atmospheric pressure the piston 51 is forced in a direction such that the lever 41 will be swung successively onto the contacts 42, thus closing the circuit. When the pressure in the conductor 50 becomes lower than atmospheric the lever 41 will be swung off from the contacts 42, thus breaking the circuit. The latter operation is obtained by the air entering the cylinder 48 through the opening 49 and forcing the piston 51 to the position shown in Fig. 8, and also in Fig. 10. It will thus be seen that when the piston 51 is reciprocated the electric circuit will be alternately opened and closed and the motor 39 alternately supplied with and cut off from current from the generator 40. The motor 39 when driven by the current will, through the mechanism already described, reciprocate the pistons in the cylinders 5. Preferably, the relative disposition of the crank pins 25 is such that the pistons will move simultaneously in opposite directions so that when compression is taking place in one cylinder a charge will be entering the other cylinder. On the shaft 23 is secured a fly wheel 55.

56 denotes a refrigerator casing in which is mounted a receptacle 57 for containing a liquid in which is immersed a portion of a sinuously formed conductor comprising an expansion chamber 58.

59 denotes a valve casing secured to one end of the expansion chamber 58 and having mounted therein a valve 60 by which entrance into the chamber 58 of compressed refrigerating fluid is controlled.

Two conductors are connected respectively at one set of ends to the expansion chamber 58, the other set of ends being connected respectively to the compressing means. These two conductors serve to convey compressed fluid from the compressing apparatus to the expansion chamber and expanded fluid from the expansion chamber to the compressing apparatus.

The conductor 61 which conveys the compressed fluid from the compressing mechanism to the expansion chamber 58, is provided at one end with two branch conductors 62, connected respectively with the chambers 15 of the cylinders 5, as shown in Figs. 1 and 3. The conductor 61 is provided with a helically coiled portion 63, which is located in the receptacle or cylinder 3. The upper end of the helical portion 63 is the inlet end and the lower end is the outlet end.

Intermediate the helical portion 63 of the conductor 61 and the branches 62, and forming a part of said conductor, is an oil receptacle comprising a vertical closed hollow cylinder 64, into which lubricating oil passing from the cylinders 5 is deposited and thus separated from the compressed refrigerating fluid. To the lower end of the oil receptacle 64 is secured a discharge pipe 65, through which the oil is withdrawn from said receptacle. In said discharge pipe is located a shut-off cock 66, which normally closes said discharge pipe. In the conductor 61 and forming a part thereof intermediate the valve casing 59 and the lower or discharge end of the helical portion 63, is a closed receptacle 67, adapted to receive and form a storage chamber for the liquid refrigerating fluid which has been condensed in passing through the helical portion 63.

The receptacle 3 is adapted to contain a cooling medium, such as water, in which the helical portion 63 is immersed, said helical portion forms, therefore, a condenser in which the condensed fluid is cooled and converted in a liquid which is deposited in the receptacle 67. The inlet for the receptacle 67 is at the top thereof and is controlled by a valve 69. The outlet of said receptacle 67 is a vertical tube 68 located in said receptacle with its lower end disposed a short distance above the bottom of said receptacle, as shown in Fig. 2. Said outlet is controlled by a valve 70. The discharge end of the conductor 61 is secured to the inlet end of the valve casing 59. One end of a conductor 71 is connected to the conductor 61 intermediate the valve casing 59, and the receptacle 67. The other end of the conductor 71 is connected to a pressure gage 72 of any desired type, by means of which the pressure existing in the conductor 61 is ascertained. A similar pressure gage 73 is connected by a conductor 74 with the conductor 50. The latter named pressure gage denotes the pressure of the refrigerating fluid in the conductor 50.

The inlet end of the return conductor which conveys the expanded fluid from the expansion chamber 58 to the compressing cylinders, is connected with the discharge end of said expansion chamber, as shown in Figs. 1 and 2. The other end of the return conductor 75 is provided with two branches 76 which are respectively connected with the cylinders 5 adjacent to the lower ends thereof, as shown in Figs. 1 to 4. Intermediate the branches 76 and the expansion chamber 58 the conductor 75 is provided with a helically coiled portion 77, shown in Figs. 1 and 4, located concentrically in the water receptacle 3, within the helical portion 63 of the conductor 61. The helical portion 77 is immersed in the liquid contained in the receptacle 3 and is located sufficiently close to the helical portion 63 to receive heat from the portion 63, thereby assisting in lowering the temperature of the compressed refrigerating fluid. Each branch 76 is provided with an oil inlet in which is mounted an oil cup 78 by which lubricating oil is fed through the branches 76 into the cylinders 5.

A conductor 78' having its discharge end located above the receptacle 3 conveys water or other cooling fluid into said receptacle from a source of supply, not shown. As shown in Fig. 1, a shut off valve 79 is located in the conductor 78'. A discharge pipe 86 may be connected to the upper end of the receptacle 3, as shown in Figs. 1, 3 and 4, to carry off surplus water.

Each cylinder 5 is provided with an annular space encircling the piston chamber of the cylinder, said space, denoted by 80, being normally filled with water which forms a water jacket for cooling the cylinder. A conductor 81 is connected at its upper end, as shown in Fig. 2, to the lower end of said water jacket space 80. The lower end of said conductor 81 is connected to the receptacle 3, adjacent to the lower end thereof and from which it supplies water to the water space 80. Two tubes 82, respectively connect the upper ends of the water jacket spaces 80 with the receptacle 3. By means of the conductors 81 and the tubes 82 fresh water is constantly supplied to the water spaces 80.

As shown in Fig. 10, an ordinary manually operated cut-off 83 is inserted in the conductor 44.

As shown in Figs. 1 and 2, the receptacle 67 has secured to its upper end the lower end of a supply conductor 84 through which the refrigerating fluid, such as liquid ammonia, is introduced into said receptacle. The inlet end of said conductor 84 is normally closed by means of a closure 85.

In the operation of the above described apparatus a sufficient supply of refrigerating fluid is first placed in the receptacle 67. The manually operated cut-off 83 is then swung to a position in which the electric circuit is closed. The rheostat lever 41 is then swung to a position closing the electric circuit, this closing movement being in the first instance effected by hand. The valve 60 is then opened so as to permit the fluid to pass from the receptacle 67 into the expansion chamber and from there by means of the conductor 75 into the cylinders 5. The electric circuit having been closed the motor 39 is thus supplied with current from the generator 40 and will be driven by the current and in turn will, through the mechanism already described, cause reciprocation of the pistons in the cylinders 5. The pistons in reciprocating will cause a partial vacuum to be formed in said cylinders in alternate order. As each piston moves upwardly in its cylinder 5 the partial vacuum will be formed below the piston and in the branch 76 connected with the cylinder 5. A partial vacuum will also be formed in the conductor 75 and expansion chamber 58. The liquid refrigerating fluid entering the expansion chamber 58 from the conductor 61 will expand into gaseous form, and will absorb heat from the liquid contained in the pan or receptacle 57, thus effecting the desired refrigeration. The expanded fluid will pass from the expansion chamber 58 through the conductor 75 and helical portion 77 thereof and will then in alternate order pass through the branches 76 into the cylinders 5 below the pistons mounted therein. As each piston moves downwardly the expanded fluid will pass lengthwise through the piston by means of the longitudinal opening 8 therein, past the valve 9, which on the downward movement of the piston will be raised against the pressure of the spring 11. As each piston moves upward the valve 9 will close and the expanded fluid will be compressed. Each spring 19 which holds the cup valve 16 in the closed position is of sufficient strength to hold the fluid in the cylinder chamber until the desired degree of compression has been obtained. The valve 16 will then be raised and the compressed fluid will pass from the cylinder 5 through the passage 18 into chamber 15, thence by means of the branch 62 connected therewith into the conductor 61 and oil receptacle 64, where the oil is deposited, the compressed gaseous fluid then passing through conductor 61 into the helical portion 63, in which it is cooled and condensed into a liquid, which enters the receptacle 67. The refrigerating liquid then passes by means of the pipe 68 and conductor 61 into the valve casing 59, in which it expands into gaseous form the gas passing into the expansion chamber 58. When sufficient liquid is liberated past the valve 60 into the expansion chamber to effect the desired refrigeration the pressure within the expansion chamber 58 and conductors 50 and 75 will be greater than atmospheric pressure and the piston 51 in the cylinder 48 will be forced by the gas pressure to the end of the cylinder 48 provided with the air inlet 49. In this position of the piston 51 the rheostat lever 41 will be swung to the position shown in dotted lines in Fig. 8, in which position the motor 39 will receive the maximum amount of current and will drive the compressing mechanism at maximum speed. In case that the pressure in the chamber 58 and conductors 75 and 50 falls below the atmospheric pressure, the pressure of the atmosphere will force the piston 51 and through it the lever 41 to the position shown in solid lines in Figs. 2, 8 and 10. In this position the circuit will be broken and the motor 39 not being supplied with current will stop running, thus stopping the operation of the compressing mechanism until the valve 60 is moved to a position permitting more liquid to enter the expansion chamber 58. When sufficient liquid has entered the expansion chamber and by its expansion has increased the pressure in said chamber and in the conductor 50 above atmospheric pressure, the piston 51 and with it the lever 41 will be forced to the position shown in dotted lines in Fig. 8, thereby again closing the electric circuit, upon which the motor 39 will start running and will operate the compressing mechanism, as hereinbefore described.

When it is desired to stop the action of the apparatus it is but necessary to close the valve 60. This being done the continued operation of the compressing mechanism will quickly reduce the pressure in the expansion chamber 58 and conductor 50 below atmospheric pressure and the lever 41 and piston 51 will, as already described, be forced automatically to the position shown in solid lines in Figs. 8 and 10, thus breaking the circuit and causing the motor and compressing mechanism to cease operating. By closing the valves 69 and 70 the liquid in the receptacle 67 may be retained under pressure so that when it is desired to operate the apparatus it may be started by simply opening the valves 60 and 70. In such case sufficient liquid may be forced into the expansion chamber 58 to produce a pressure therein above atmospheric, upon which, as already described, the apparatus will be automatically started into operation. After action of the compressing mechanism has been begun the valve 69 is opened.

By passing the expanded fluid through the helical portion 77, it absorbs heat from the water contained in the receptacle 3, the water in turn absorbing the heat from the compressed fluid contained in the condenser 63. Thus a double function is effected. The temperature of the compressed fluid is reduced, while at the same time the temperature of the expanded fluid in the conductor 75 is raised from approximately 40° Fah. to about 60° Fah. It thus enters the cylinders 50 at a temperature too high to cause freezing. For this reason it is practicable to bring the expanding gas into the lower or colder ends of the cylinders without danger of freezing up the working mechanism.

Another valuable feature of my invention is the saving of water which is employed for condensing the compressed refrigerating fluid. The cold expanded fluid passing through the helical portion 77 retains the water at a comparatively low temperature, thus preventing loss of water through excessive evaporation which would otherwise occur owing to the great amount of heat imparted to the water from the helical portion 63.

My invention may be subjected to various modifications within the scope of the appended claims without departing from its spirit.

Having thus described my invention, what I claim and desire to secure by Letters Patent is:—

1. In a refrigerating apparatus, the combination with a compressor cylinder, of a piston mounted therein, an expansion chamber, a conductor leading from the expansion chamber to the cylinder and provided with an inlet for oil, said inlet being disposed so that oil deposited therein will run into the cylinder, and a conductor connected with the cylinder and with the expansion chamber for conveying compressed fluid from said cylinder to the expansion chamber, the latter named conductor having a portion comprising a condenser for condensing the fluid carried in said conductor, the latter named conductor having also located therein an oil receptacle in which the oil is separated from the compressed fluid prior to the passage of said fluid into said condenser portion, said receptacle having an outlet for the oil and a valve controlling said outlet.

2. In a refrigerating apparatus, the combination with a compressor cylinder provided with an inlet and an outlet, of a conductor connected with said inlet for conveying to said cylinder fluid to be compressed, said conductor having means by which oil may be deposited and carried therein to said cylinder, and a discharge conductor connected with the outlet of said cylinder and having a portion forming a condenser in which the compressed fluid is condensed, the latter named conductor having located therein intermediate said cylinder and said condenser portion a receptacle in which oil conveyed in said conductor is discharged and separated from the compressed fluid, said receptacle being provided with a draw-off cock.

3. In a refrigerating apparatus, the combination with a suitable support, of a receptacle mounted on said support and adapted to contain a cooling medium, of two compressor cylinders mounted on said support at diametrically opposite sides of said receptacle and provided each with an inlet and an outlet, of a rotary driving shaft mounted on said support and extending transversely under said receptacle, two pistons mounted respectively in said cylinders, means by which, when said driving shaft is rotated, said pistons are reciprocated in opposite directions, and two conductors for respectively conveying compressed and expanded fluid from and to said cylinders, said conductors each having a portion thereof normally covered by said cooling medium in said receptacle, the discharge end of the conductor for conveying expanded fluid having two branches connected respectively with the inlets of said cylinders, the inlet end of said conductor for conveying compressed fluid having two branches connected respectively with the outlets of said cylinders.

4. In a refrigerating machine, the combination with a compressing cylinder, of two conductors connected therewith for conveying respectively compressed and expanded fluid, a receptacle for containing liquid in which said conductors are normally immersed, and by which heat is transferred from one conductor to the other, and means for discharging liquid from said receptacle in contact with said cylinder and then conveying the liquid back to said receptacle.

5. In a refrigerating machine, the combination with a compressing cylinder having a jacket, of two conductors connected with said cylinder for conveying compressed and expanded fluid, a receptacle for containing liquid in which said conductors are normally immersed, and means for conveying liquid from said receptacle to said jacket and back to said receptacle.

6. In a refrigerating machine, the combination with a compressing cylinder having a jacket for containing liquid, of an expansion chamber, a conductor for conveying compressed fluid from the cylinder to the expansion chamber, a return conductor for conveying fluid from the expansion chamber to the cylinder, a receptacle for containing liquid, said conductors being normally immersed in said liquid, means for regulating the supply of fluid which passes from the compressing cylinder to the expansion chamber, and means for conveying liquid from said receptacle to said jacket and back to said receptacle.

7. In a refrigerating machine, the combination with a compressing cylinder having a water jacket, of a piston reciprocative in said cylinder, a motor, means connected with the motor for reciprocating said piston, an expansion chamber, a conductor for conveying compressed fluid from said cylinder to said expansion chamber, a return conductor for conveying fluid from said expansion chamber to said cylinder, a water receptacle through which said conductors pass, means operated by pressure in one of said conductors for controlling said motor, and means connecting said receptacle and said water jacket by which water circulates between the receptacle and the water jacket.

In testimony whereof I have signed my name to this specification in presence of two subscribing witnesses.

JOHN HEINRICH.

Witnesses:
E. B. House,
E. T. Powers.